(12) United States Patent
Martinsons et al.

(10) Patent No.: US 11,892,355 B2
(45) Date of Patent: Feb. 6, 2024

(54) VERY WIDE-ANGLE VIEWING ACCESSORY FOR INFRARED DETECTOR

(71) Applicant: CENTRE SCIENTIFIQUE ET TECHNIQUE DU BÂTIMENT (CSTB), Champs-sur-Marne (FR)

(72) Inventors: Christophe Martinsons, Le Touvet (FR); Pierre Lepretre, Grenoble (FR)

(73) Assignee: CENTRE SCIENTIFIQUE ET TECHNIQUE DU BÂTIMENT (CSTB), Champs-sur-Marne (FR)

( * ) Notice: Subject to any disclaimer, the term of this patent is extended or adjusted under 35 U.S.C. 154(b) by 399 days.

(21) Appl. No.: 17/419,989

(22) PCT Filed: Jan. 8, 2020

(86) PCT No.: PCT/EP2020/050310
§ 371 (c)(1),
(2) Date: Jun. 30, 2021

(87) PCT Pub. No.: WO2020/144230
PCT Pub. Date: Jul. 16, 2020

(65) Prior Publication Data
US 2022/0082443 A1    Mar. 17, 2022

(30) Foreign Application Priority Data

Jan. 8, 2019  (FR) ..................... 1900159

(51) Int. Cl.
*G01J 5/07*   (2022.01)
*G01J 5/00*   (2022.01)
(Continued)

(52) U.S. Cl.
CPC .............. *G01J 5/07* (2022.01); *G01J 5/0025* (2013.01); *G02B 17/061* (2013.01); *G02B 17/0808* (2013.01); *H04N 5/33* (2013.01)

(58) Field of Classification Search
CPC ..... G02B 17/061; G02B 17/0808; G01J 5/07; G01J 5/0025; G01J 5/0806
See application file for complete search history.

(56) References Cited

U.S. PATENT DOCUMENTS 4,439,012 A   3/1984 Christy
5,854,713 A  12/1998 Kuroda et al.
(Continued)

FOREIGN PATENT DOCUMENTS

CN      102928961 A   2/2013
EP        1341139 A2  9/2003
(Continued)

OTHER PUBLICATIONS

Japanese Office Action from Corresponding Japanese Application No. 2021-539460, dated Jul. 18, 2023.
(Continued)

*Primary Examiner* — David P Porta
*Assistant Examiner* — Casey Bryant
(74) *Attorney, Agent, or Firm* — Ronald M. Kachmarik; Cooper Legal Group LLC

(57) ABSTRACT

An optical device designed to be arranged on a detector provided with an infrared sensor for increasing the angle of the field of view of the detector. The device includes a primary mirror and a secondary mirror that face each other. The primary mirror collects the infrared radiation from a wide-angle field of view to return it to the secondary mirror, which in turn reflects it back to the sensor of the infrared detector.

10 Claims, 3 Drawing Sheets

(51) Int. Cl.
　　　*G02B 17/06*　　(2006.01)
　　　*G02B 17/08*　　(2006.01)
　　　*H04N 5/33*　　(2023.01)

(56) References Cited

U.S. PATENT DOCUMENTS

| | | |
|---|---|---|
| 8,514,280 B2 | 8/2013 | Zisa et al. |
| 9,933,604 B1 | 4/2018 | Lu |
| 2009/0141344 A1 | 6/2009 | Bergeron et al. |
| 2014/0200071 A1* | 7/2014 | Czyzewski ......... G07F 17/3288 |
| | | 463/25 |
| 2022/0074792 A1* | 3/2022 | Martinsons ............ G02B 17/08 |

FOREIGN PATENT DOCUMENTS

| | | |
|---|---|---|
| EP | 2405413 B1 | 2/2013 |
| FR | 2833717 A1 | 6/2003 |
| FR | 2847349 A1 | 5/2004 |
| FR | 2913778 A1 | 9/2008 |
| JP | H11119104 A | 4/1999 |
| JP | 2002-131808 A | 5/2002 |
| JP | 2003-167195 A | 6/2003 |
| JP | 2010060728 A | 3/2010 |
| WO | 94012905 A1 | 6/1994 |
| WO | 2007080241 A1 | 7/2007 |

OTHER PUBLICATIONS

International Search Report corresponding to International Application No. PCT/EP2020/050310 dated Apr. 17, 2020, 6 pages.

* cited by examiner

[Fig 1]
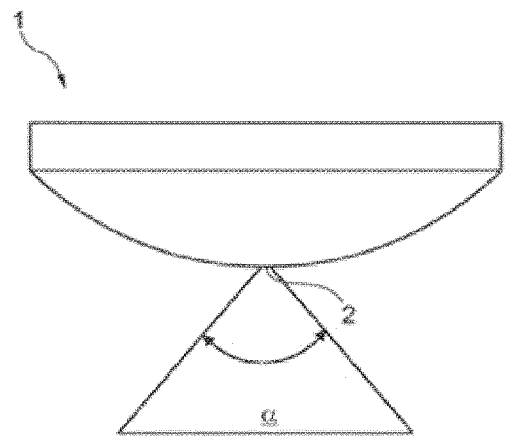
(prior art)
[Fig 2]
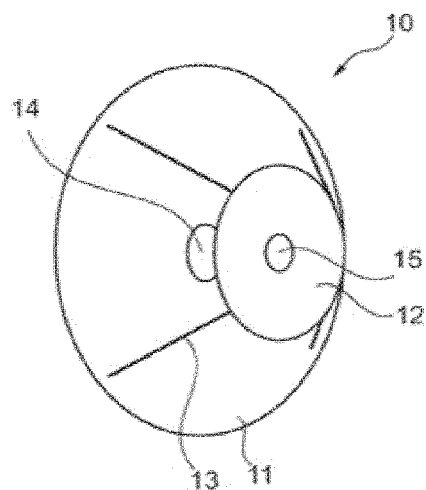
[Fig 3]
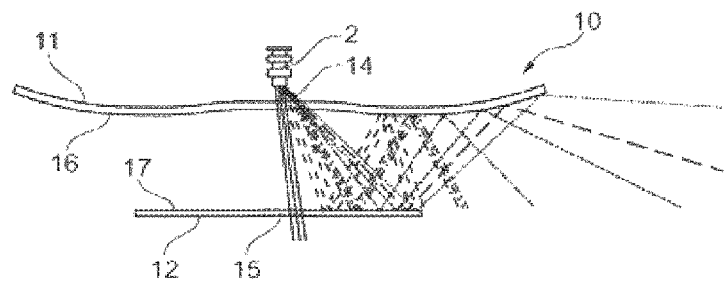

[Fig 4]
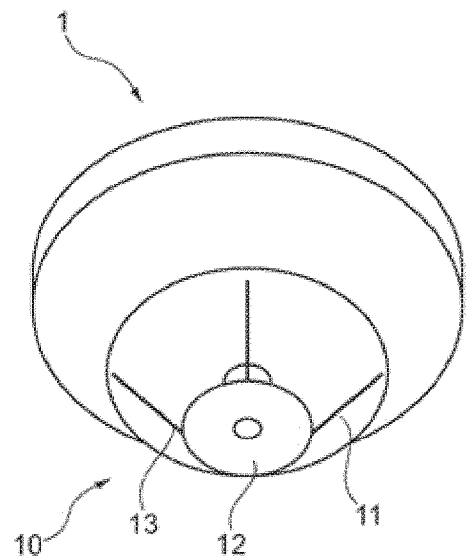
[Fig 5]
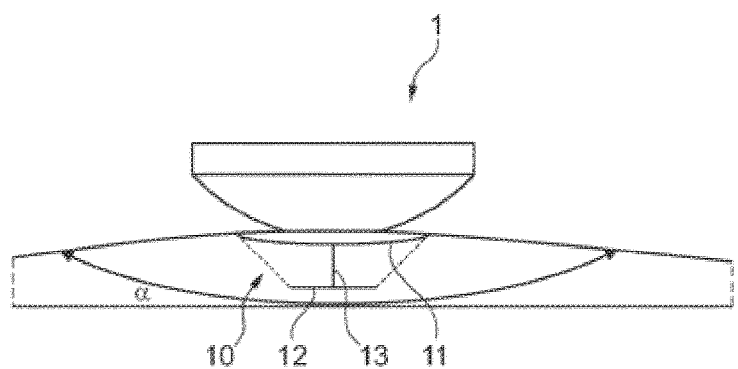

[Fig 6]
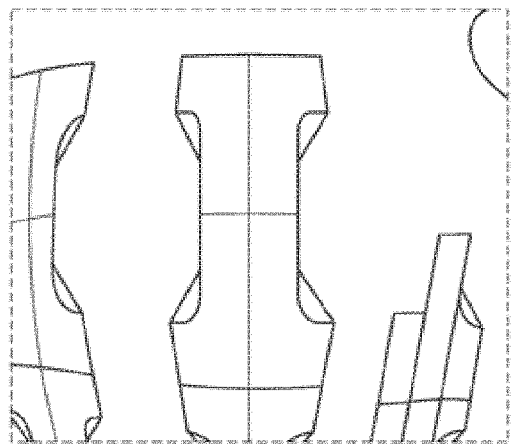
(prior art)
[Fig 7]
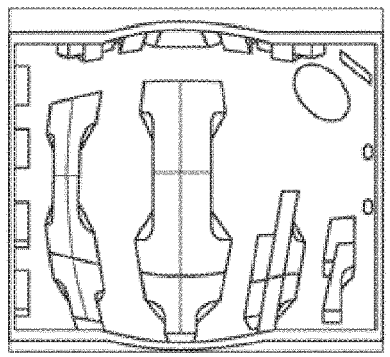
[Fig 8]
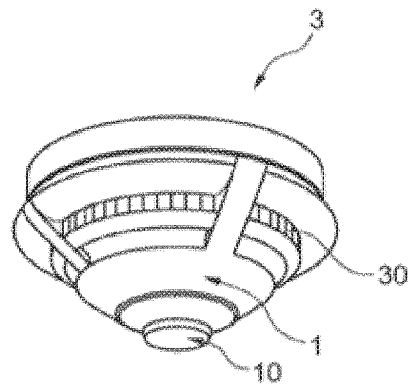

VERY WIDE-ANGLE VIEWING ACCESSORY FOR INFRARED DETECTOR

TECHNICAL FIELD

The present invention relates to the field of optical systems comprising one or more optical components designed to reflect infrared radiation or cause such radiation to converge or to diverge.

The invention seeks more particularly to propose a simple and inexpensive optical device that allows the field of view of an infrared detector to be widened without the use of lenses and without the effect of obscuring part of the field of view.

In another of its aspects, the invention also targets a smoke detector comprising an infrared detector and the optical device as described hereinabove.

In another of its aspects, the invention also relates to an optical accessory that can be mounted on or removed from an existing infrared detector, the optical accessory comprising an optical device as described hereinabove.

The main application targeted by the invention is the widening of the field of view of an infrared detector comprising a sensor of moderate resolution, comprising for example 64×64 or 80×80 sensitive elements. This type of sensor has a resolution that is good enough to allow imaging applications.

Although described with reference to the main application, the invention applies to any type of infrared detector for which there is a need to increase the angle of the field of view of the detector in a way that is simple and inexpensive.

PRIOR ART

There are a number of technologies that can be used to manufacture sensors operating in the infrared domain Thus, pyroelectric sensors and thermopiles are widely used for detectors of very low resolution, conventionally comprising just a few sensitive elements. Sensors incorporating microbolometers are employed in medium- and high-resolution sensors that can be used as imagers.

There is a growing interest in sensors of moderate resolution, which are able to implement basic imaging functions, such as locating an infrared source.

Such sensors may have a resolution comprised between 16×16 pixels and 80×80 pixels and may operate using one of the aforementioned technologies.

The execution of numerous functions of the very low-resolution detectors can be improved by the use of moderate-resolution sensors. In addition, this type of sensor allows new applications.

One of the main applications of existing infrared sensors, of pyroelectric type, is motion detection.

This is the principle employed for example in anti-intrusion detectors which are installed in a large number of buildings.

An anti-intrusion alarm system typically relies on a pyroelectric sensor comprising two or four sensitive elements associated with a simple and cost-effective optical device that defines the field of view of the detector. This optical device may notably be a Fresnel lens array made of polyethylene (PE) or a collection of mirrors each made from a substrate made of a plastic such as polymethyl methacrylate (PMMA) or polycarbonate (PC), metallized at least on its functional surface.

An anti-intrusion detector of this type is qualified as a passive detector because it does not emit any radiation.

The operation of an anti-intrusion detector relies on observing a simultaneous variation in the ambient infrared flux received by all of the sensitive elements of the sensor.

There are a number of possible configurations for an anti-intrusion detector: ceiling-mounted, in which case the field of view is typically of the order of 360° in azimuth and approximately 45° in elevation, on each side of the vertical, or wall-mount, in which case the field of view of the detector may be determined according to the configuration of the walls of the room in which it is installed.

Because of the low resolution of the sensors employed, these detectors are unable to provide information regarding the location of an infrared source.

In addition, limitations inherent to pyroelectric-sensor technology make it impossible to detect individuals who are motionless or who are moving at running speed: specifically, in order to be detected, a variation in infrared flux needs to have a frequency comprised between approximately 0.5 Hz and 5 Hz.

Thus, motion detectors face a number of limits liable to impair their use, these limits including:
- the fact that it is impossible to identify the location of the source of the infrared signal, unless, potentially, a network of several detectors is employed: see, for example, patent application WO2007/080241 A1 or patent U.S. Pat. No. 8,514,280 B2,
- the fact that it is impossible to identify the shape of the source, for example to distinguish an individual from an animal, in a way that is reliable, unless, once again, a plurality of detectors, typically combined vertically, is used, see for example patent EP 2405413B1 and patent application EP1341139 A2;
- the fact that it is impossible to detect individuals who are motionless, and
- the fact that a detector may potentially be triggered by a motionless source of which the temperature changes abruptly, for example a radiator or a movement of hot or cold air.

There are also monitoring systems that employ an infrared detector as described hereinabove, which is coupled with a video monitoring system, the triggering of which is controlled by the triggering of the infrared detector.

The images obtained by the video system may be transmitted to a mobile phone, to a personal computer or to a remote-monitoring company, so as to be able to remove any doubt as to the cause of the triggering of the infrared detector.

This operation minimizes the risks of inappropriate triggering of the alarm, although this is at the expense of a monitoring system that is significantly more complex than a simple infrared detector.

In this context, the use of sensors of moderate resolution, for example sensors comprising a 64×64 or 80×80 array of sensitive elements may reduce the aforementioned disadvantages of motion detectors by notably allowing basic functionalities of source location and shape recognition.

As a result, an infrared sensor of moderate resolution would allow monitoring systems that employ the coupling of an infrared detector with a video system to be simplified because this sensor would be able to replace the infrared detector and the video system and the system that illuminates the field of view of the video system, while at the same time minimizing the risks of inappropriate triggering of the alarm.

An infrared sensor of moderate resolution also overcomes the problems associated with the issues of personal privacy and confidentiality, because faces are impossible to recognise because of the limited resolution of the sensor.

Other applications of infrared detectors are likely to benefit from the use of moderate-resolution sensors, as opposed to sensors equipped with just a few sensitive elements and which therefore do not have imaging and location capability.

Thus, in the case of fire alarms, there are thermovelocimetric detectors which are sensitive to an abnormal increase in ambient temperature which characterizes the presence of a source of heat.

Although reliable, these detectors are limited insofar as they are unable to locate the source of the heat. The use of a sensor provided with imaging capabilities, even limited imaging capabilities, would allow this disadvantage to be overcome.

Occupancy detectors, which usually control the automatic switching of lighting, could also benefit from sensors of moderate resolution.

Similar to the anti-intrusion detectors in their operation, occupancy detectors are not, in particular, sensitive to infrared sources that are motionless, such as an individual who is holding a stationary pose. This may therefore cause a lighting system to switch off, despite the fact that individuals really are present in the room concerned.

Other systems still, such as air conditioning systems, may use a low-resolution imaging function, for example in order to estimate the number of occupants in a room.

The company Mitsubishi Electric thus markets an air conditioner provided with a sensor comprising eight thermopiles arranged vertically.

The sensor is rotated by a motor to perform a sweep of the room and construct an infrared image of the room.

Such a system could advantageously be replaced by a moderate-resolution sensor equipped with a wide-angle field of view so as to avoid the introduction of a relatively complex motorized drive mechanism.

In addition, a growing benefit for applications of counting individuals or managing queues of individuals waiting in line may be observed, for example for security or space-management reasons.

In this context, the company Irisys has developed a pyroelectric sensor with a resolution of 16×16 pixels.

This sensor, which can be installed for example above a queue of individuals waiting in line in a store, is associated with a lens made of germanium or of chalcogenide glass to obtain a field of view of limited angle, of the order of 50° to 60°.

The resolution of the sensor, although relatively low, is nevertheless sufficient to obtain a good approximation of the number of individuals and of their location in the waiting line.

FIG. 1 schematically depicts an infrared detector 1 according to the prior art, comprising an imager of moderate resolution and intended to be fixed to a ceiling.

The infrared radiation enters the detector through the optical system 2, which notably comprises a focusing lens at the input and an infrared sensor.

The angle α of the field of view of such a detector is conventionally comprised between 70° and 90°.

However, the use of moderate-resolution sensors as described hereinabove, capable of performing basic imaging functionalities, remains commercially challenging.

In particular, the cost of a sensor of this type and of the wide-angle infrared optical components required for the target applications represent significant obstacles to the commercialization of this type of solution.

Thus, because of the high cost of the optics suitable for infrared radiation, such as the lenses made of germanium or of chalcogenide glass, the detectors that incorporate existing moderate-resolution imagers have a relatively restricted field of view, typically not exceeding an angle of the order of 70° to 90°.

It is possible to obtain an angle of as much as 120° by using an optimized aspherical lens, although this is at the expense of a significant degree of distortion and extensive heterogeneity in the illumination of the sensor.

There is therefore still a need to improve the amplitude of the field of view of the existing infrared sensors, particularly in order to overcome the disadvantages of the existing solutions.

The object of the invention is to address this need.

DISCLOSURE OF THE INVENTION

In order to do this, one subject of the invention is an optical device, intended to be arranged on a detector equipped with an infrared sensor in order to increase the angle of the field of view of the detector, comprising:
  a primary mirror of circular overall shape, comprising a circular opening at its center,
  a secondary mirror of circular overall shape and of diameter smaller than the diameter of the primary mirror, comprising a circular opening at its center,
  at least one connecting means for connecting the primary mirror and the secondary mirror, so that the reflective surface of the primary mirror is arranged facing the reflective surface of the secondary mirror,
  the primary and secondary mirrors being designed to reflect radiation in the infrared; and
  the primary and secondary mirrors being configured to form an afocal optical system and to form a continuous very wide-angle image with the center of the image obtained by the central circular openings, the angle (α) of the field of view of the device being greater than 90°.

Thus, the invention essentially consists in the use of two mirrors facing one another, the primary mirror collecting the infrared radiation from a wide-angle field of view to pass it on to the secondary mirror, which in turn reflects it toward the infrared detector.

The central openings make it possible to avoid any obscuring of the central part of the image such as that produced by a conventional two-mirror optical system of the Cassegrain telescope type.

The image obtained consists of a peripheral part formed by the mirrors and a central part passing through the mirrors via the central openings, the image being continuous, which is to say free of discontinuity between the peripheral part and the central part.

That is rendered possible by the fact that the primary and secondary members form an afocal optical system. That allows the rays that form the peripheral part and the rays that form the central part to be focused in the same way by a focusing lens of the sensor of the detector on which the device according to the invention is intended to be arranged.

In order for the assembly made up of the primary mirror and of the secondary mirror to be afocal, it is necessary for the curvature of the first mirror to compensate for the curvature of the secondary mirror. Thus, the mirrors do nothing more than reflect the incident rays without focusing these: the focusing function is performed by the lens of the detector.

A continuous very wide angle image is thus formed, by means of a device that is simple, compact and inexpensive to manufacture.

What is meant here and in the context of the invention by a "continuous very wide-angle image" is an image without discontinuity, without any obscuration and of which the angular field is very large, preferably at least equal to 120° and up to 360°.

The reflective surfaces of the mirrors are configured to perform this function.

Advantageously, the image obtained by the optical device according to the invention comprises no shadow zone caused by potential central obscuration of the field of view: specifically, the presence of central openings in the primary and secondary mirrors and the configuration of the mirrors make it possible to obtain an image that is continuous, and therefore has no central obscuration of the center of the image.

Advantageously, the use of mirrors on the one hand makes it possible to avoid the use of costly infrared lenses, and on the other hand makes it possible to obtain an afocal reflective optic.

Furthermore, aspherical corrections of the image may be obtained.

By virtue of the invention, what is therefore obtained is an infrared optical device with a wide field of view which also allows a sharp, corrected image, with no central obscuration of the center of the image, to be obtained using an infrared detector according to the prior art. In addition, the bulkiness of the device is significantly reduced in comparison with a device comprising a refractive panoramic optic of the "fish-eye" type involving lenses.

According to one particular embodiment, the angle of the field of view of the device is greater than 140°, preferably greater than 165°.

According to one specific embodiment of the invention, the reflective surfaces of the primary mirror and of the secondary mirror each have a radial profile known by the name of "extended odd asphere" defined by the equation:

$$z(r) = \frac{cr^2}{1 + \sqrt{1 - (1+k)c^2 r^2}} + \sum_{i=1}^{N} a_i \rho^i. \quad \text{[Math 1]}$$

This equation defines the height z of the profile as a function of the radial distance r to the center of the mirror, $\rho$ is the normalized radial coordinate and the coefficients N, c, k, $\alpha_i$ are constants.

As a preference, the optical device according to the invention is made up of a single piece of injection-molded plastic, such as polymethyl methacrylate (PMMA) or polycarbonate (PC), at least the surfaces of the primary mirror and of the secondary mirror being metalized.

The invention also relates to an infrared detector comprising an optical device as described hereinabove, arranged in such a way as to increase the angle of the field of view of the detector.

The invention further relates to a smoke detector comprising an infrared detector as described hereinabove.

The invention also relates to the use of this smoke detector to detect or locate hotspots and to measure the rate of change of wall temperature, and to the use of this smoke detector to detect the presence of occupants in a smoke-filled room and to count the number of occupants.

The invention also relates to the use of the optical device as described hereinabove to assist with night driving using infrared night vision or to manage the thermal comfort in the interior of a vehicle or to detect pedestrians and motor vehicles or to monitor sensitive sites.

Finally, the invention relates to an optical accessory intended to be arranged on an infrared detector, comprising an optical device as described hereinabove and a mechanism for attaching the optical device to the infrared detector.

BRIEF DESCRIPTION OF THE DRAWINGS

FIG. 1 is a schematic side view of an infrared detector according to the prior art;

FIG. 2 is a schematic view of an optical device according to the invention;

FIG. 3 illustrates an optical device according to the invention, viewed in section;

FIG. 4 is a schematic view of an optical device according to the invention arranged on an infrared detector according to the prior art;

FIG. 5 is a side view of an optical device according to the invention arranged on an infrared detector according to the prior art;

FIG. 6 is an image obtained by an infrared detector according to the prior art;

FIG. 7 is a simulation of the image obtained by an infrared detector according to the prior art on which an optical device according to the invention is arranged;

FIG. 8 depicts a smoke detector equipped with an optical device according to the invention.

DETAILED DESCRIPTION

Throughout the present application, the terms "vertical", "lower", "upper", "low", "high", "bottom" and "top" are to be understood with reference to an infrared detector in the configuration of operation mounted on a ceiling and facing toward the ground. Thus, in an operating configuration, the sensor of the infrared detector faces the ground in the vertical direction.

FIG. 1 has already been described in the preamble, and is therefore not commented upon hereinafter.

An optical device according to the invention is now described with reference to FIGS. 2 to 5.

The optical device 10 comprises a primary mirror 11, a secondary mirror 12 and connecting means 13 for connecting the primary mirror and the secondary mirror.

In the embodiment illustrated, the connecting means 13 are rigid connecting means consisting of four supports of elongate shape distributed at equal angles, each attached by one of its ends to the primary mirror and by the other end to the secondary mirror.

The primary mirror 11 comprises a central opening 14 and a reflective surface 16. The secondary mirror 12 comprises a central opening 15 and a reflective surface 17.

The reflective surfaces 16 and 17 are arranged facing one another.

The central openings 14 and 15 face one another and advantageously allowed infrared radiation having an angle of inclination close to 0° with respect to the vertical to pass through them. This is more clearly visible in FIG. 3 in which the line of the optical rays shows the rays passing through the central openings 14, 15.

In this way, the optical device according to the invention avoids any central obscuration of the field of view by the secondary mirror 12.

The reflective surfaces 16, 17 are configured to make it possible to obtain a wide-angle, sharp and continuous image, with aspherical corrections.

As visible in FIG. 3, the surface of the primary member 11 notably has a domed profile on a radially exterior part. This profile is such that the incident rays, even those with a highly grazing angle of incidence, are passed on to the secondary mirror 12, of which the profile is designed to direct the rays onto the optical system 2 of the detector.

In this way, the angle α of the field of view of the detector equipped with an optical device according to the invention may preferably reach as much as 140° to 170°. The angle α may also exceed 180°, but that would cause a ceiling-mounted detector to be looking at part of this ceiling. It may, however, be beneficial for the angle to exceed 180° in the context of applications other than that of a ceiling-mounted detector.

The two mirrors 11, 12 advantageously form an afocal device.

The central openings 14, 15 and the reflective surfaces 16, 17 are configured so that the image received by the detector is continuous.

Specifically, the infrared sensor of the optical system 2 of the detector 1 receives, on the one hand, radiation coming directly from the environment that is to be observed, through the central openings 14, 15 and, on the other hand, radiation reflected by the primary mirror 11 and the secondary mirror 12. The configuration of the central openings 14, 15 and of the reflective surfaces 16, 17 is defined so that the image formed on the sensor is continuous.

In particular, the reflective surface of the primary mirror is configured so that its curvature compensates for the curvature of the reflective surface of the secondary mirror. The mirrors do nothing more than reflect the incident radiation without focusing it, and therefore form an afocal system. That makes it possible to obtain an image that is continuous with the rays that form the center of the image, which pass through the central openings 14, 15 without being reflected, because the rays, whether or not they have been reflected, are focused in the same way by the focusing lens of the infrared detector.

For example, in order to achieve this result, the coefficients of the equation for the "extended odd asphere" profile of the primary mirror may be as follows:

N=4;
Normalization radius ρ: 40.36 mm;
$c=2.34\times 10^{-2}$ mm$^{-1}$;
k=0;
$\alpha_1=-2.21$ mm;
$\alpha_2=-2.63\times 10^1$ mm;
$\alpha_3=1.25\times 10^1$ mm;
$\alpha_4=6.75$ mm.

The coefficients of the equation for the "extended odd asphere" profile of the corresponding secondary mirror may be as follows:

N=4;
Normalization radius ρ: 1037.5 mm;
$c=2.66\times 10^{-3}$ mm$^{-1}$;
k=0;
$\alpha_1=-6.02\times 10^1$ mm;
$\alpha_2=6.80\times 10^2$ mm;
$\alpha_3=6.23\times 10^4$ mm;
$\alpha_4=2.55\times 10^6$ mm.

The diameter of the primary mirror may then be 57 mm, the diameter of the secondary mirror may be 36.8 mm, and the distance between the two mirrors may be 23.8 mm.

FIG. 3 illustrates an example of a radial profile of the primary mirror and of the secondary mirror.

The optical device 10 is preferably made as a single piece of injection-molded plastic, such as polymethyl methacrylate (PMMA) or polycarbonate (PC). The entire component, or at the very least the reflective surfaces of the mirrors, are then metallized so as to be able to effect incident infrared radiation.

FIGS. 4 and 5 schematically depict an optical device 10 according to the invention arranged on an infrared detector 1.

In order to fix the optical device 10 to the detector 1, an attachment mechanism may be provided. This mechanism may for example comprise a semitransparent hemispherical dome made of polyethylene (PE) with a small thickness, typically close to 0.5 mm so as to effectively transmit the infrared radiation.

The secondary mirror is secured to the internal face of the dome and this dome is attached to the base of the detector, thus covering the device.

FIG. 6 is an image obtained by an infrared detector according to the prior art, with a field-of-view aimed at the ground and of which the angle α does not exceed 90°.

FIG. 7 shows, for comparison, the result of a computer simulation reproducing the effect obtained by fitting an optical device according to the invention on the infrared detector used for obtaining the image of FIG. 6.

It may be seen that the angle of the field of view is considerably increased by the use of an optical device according to the invention.

Thus, by virtue of the invention, a simple, compact optical device containing no lenses can be used to increase the field of view of an infrared detector.

This may be an accessory that is installed on an existing detector. Installing an optical device on a detector is easy. Specifically, the original focusing lens of the existing detector does not impede the operation of obtaining a very wide-angle continuous image according to the invention.

In addition, no additional electrical connections are required.

Finally, the precision of the positioning of the optical device is of the order of the size of one sensitive element of the infrared sensor. For a sensor with a resolution of 64×64 or 80×80, the precision of the positioning is of the order of 20 to 30 μm, which can easily be obtained with an attachment mechanism known from the prior art.

As illustrated in FIG. 8, another aspect of the invention relates to a smoke detector 3 comprising at its lower end an optical detector 10 according to the invention, and an infrared detector 1.

The smoke detector 3 comprises a smoke detection chamber 30; the smoke detection function is identical to that of a smoke detector according to the prior art.

However, incorporating an infrared detector 1 equipped with an optical device according to the invention offers numerous advantages. First of all, it improves the capabilities of the smoke detector to detecting or locating abnormally-hot spots, on the one hand, and to performing thermovelocimetric monitoring of the walls, namely monitoring the rate of increase in wall temperature.

Thanks to the wide field of view in the infrared, the smoke detector 3 is able to perform a pre-fire alarm function by monitoring an extensive zone.

Next, when the smoke detector signals the presence of smoke, the inbuilt infrared detector is capable of identifying the potential presence of occupants and of counting the number of these, providing access to information that is crucial in the event of a fire and which may be of benefit to a fire alarm control center or a rescue team. Specifically, smoke cuts out infrared radiation to a far lesser extent than it does the visible light or near infrared used by existing video-monitoring systems.

Finally, incorporating several functions within the one same detector has the result of avoiding the unattractive proliferation of ceiling-mounted detectors.

In many cases, the fitting of a smoke detector is compulsory. Now, a smoke detector is usually installed in the middle of a room, as this is a position that is good for a device that has a wide field of view.

It is therefore particularly advantageous to incorporate an infrared detector equipped with an optical device according to the invention into a smoke detector.

Other variants and advantages of the invention may be realised without thereby departing from the scope of the invention. The invention is thus not limited to the examples described hereinabove.

Although described with reference to the main target application, namely that of increasing the angle of the field of view of an infrared detector mounted on the ceiling of a room, the invention also applies to any field in which it is advantageous to widen the field of view of an infrared viewing apparatus using a simple and inexpensive optical device.

Thus, the optical device described may also be used in the automotive and transport field (for example in the context of night driving aids using infrared night vision or in the context of managing thermal comfort in the interior of a motor vehicle) or in the smart city domain (for example in the context of a public lighting system to detect pedestrians and motor vehicles or in the context of the monitoring of sensitive sites).

It may also be used in the field of the detection of presence in order to illuminate a room: advantageously, a single detector comprising an optical device according to the invention might cover a large detection volume, for example a large function room or large premises.

The invention claimed is:

1. An optical device, intended to be arranged on a detector equipped with an infrared sensor in order to increase an angle of the field of view of the detector, comprising:
    a primary mirror of circular overall shape, comprising a circular opening at its center,
    a secondary mirror of circular overall shape and of diameter smaller than the diameter of the primary mirror, comprising a circular opening at its center,
    at least one connecting means for connecting the primary mirror and the secondary mirror, so as to arrange a reflective surface of the primary mirror facing a reflective surface of the secondary mirror,
    the primary and secondary mirrors being designed to reflect radiation in the infrared; and
    the primary mirror and the secondary mirror being configured to form an afocal system and to form a continuous very wide-angle image with the center of the image obtained by the central circular openings, the angle ($\alpha$) of the field of view of the device being greater than 90°.

2. The optical device as claimed in claim 1, wherein the angle of the field of view ($\alpha$) of the device is greater than 140°.

3. The optical device as claimed in claim 1, wherein the reflective surface of the primary mirror and the reflective surface of the secondary mirror each have a radial profile defined by the equation:

$$z(r) = \frac{cr^2}{1+\sqrt{1-(1+k)c^2r^2}} + \sum_{i=1}^{N} a_i \rho^i,$$

where z is the height of the profile as a function of the radial distance r to the center of the mirror, p is the normalized radial coordinate and the coefficients N, c, k, $a_i$ are constants.

4. The optical device as claimed in claim 1, wherein the optical device consists of a single piece of injection-molded plastic, at least the surfaces of the primary mirror and of the secondary mirror being metalized.

5. An infrared detector comprising an optical device as claimed in claim 1, arranged in such a way as to increase an angle of a field of view of the detector.

6. A smoke detector comprising an infrared detector as claimed in claim 5.

7. The use of a smoke detector as claimed in claim 6 to detect or locate hotspots and to measure the rate of change of wall temperature.

8. The use of a smoke detector as claimed in claim 6 to detect the presence of occupants in a smoke-filled room and to count the number of occupants.

9. The use of the optical device as claimed in claim 1 to assist with night driving using infrared night vision or to manage the thermal comfort in the interior of a vehicle or to detect pedestrians and motor vehicles or to monitor sensitive sites.

10. An optical accessory intended to be arranged on an infrared detector, comprising an optical device as claimed in claim 1 and a mechanism configured to attach the optical device to the infrared detector.

* * * * *